(12) United States Patent
Gudorf et al.

(10) Patent No.: US 8,037,316 B2
(45) Date of Patent: Oct. 11, 2011

(54) METHOD AND SYSTEM FOR USER INFORMATION VERIFICATION

(75) Inventors: Gregory D. Gudorf, San Diego, CA (US); Brian M. Siegel, Washingtonville, NY (US)

(73) Assignees: Sony Electronics Inc., Park Ridge, NJ (US); Sony Corporation (JP)

( * ) Notice: Subject to any disclaimer, the term of this patent is extended or adjusted under 35 U.S.C. 154(b) by 152 days.

(21) Appl. No.: 11/540,231

(22) Filed: Sep. 28, 2006

(65) Prior Publication Data

US 2007/0028309 A1 Feb. 1, 2007

Related U.S. Application Data

(62) Division of application No. 09/805,555, filed on Mar. 13, 2001, now Pat. No. 7,140,045.

(60) Provisional application No. 60/220,869, filed on Jul. 26, 2000.

(51) Int. Cl.
*G06F 21/00* (2006.01)
*G06F 7/04* (2006.01)
*G06F 17/30* (2006.01)
*G06F 15/16* (2006.01)
*G06F 12/14* (2006.01)

(52) U.S. Cl. ............... 713/186; 726/7; 726/19; 726/28; 285/115; 902/3; 902/5; 705/18

(58) Field of Classification Search .................. 713/186; 726/7, 19, 28; 385/115; 902/3, 5; 705/18
See application file for complete search history.

(56) References Cited

U.S. PATENT DOCUMENTS

| 4,879,747 | A | | 11/1989 | Leighton et al. |
| 5,708,422 | A | | 1/1998 | Blonder et al. |
| 5,757,917 | A | | 5/1998 | Rose et al. |
| 5,848,412 | A | * | 12/1998 | Rowland et al. ................. 707/9 |
| 5,907,831 | A | | 5/1999 | Lotvin et al. |
| 5,963,915 | A | | 10/1999 | Kirsch |
| 6,006,333 | A | * | 12/1999 | Nielsen ............................. 726/8 |
| 6,100,811 | A | * | 8/2000 | Hsu et al. ...................... 340/5.83 |
| 6,101,482 | A | | 8/2000 | DiAngelo et al. |
| 6,101,485 | A | | 8/2000 | Fortenberry et al. |
| 6,167,382 | A | | 12/2000 | Sparks et al. |
| 6,167,435 | A | * | 12/2000 | Druckenmiller et al. ..... 709/206 |
| 6,178,510 | B1 | | 1/2001 | O'Connor et al. |
| 6,308,203 | B1 | | 10/2001 | Itabashi et al. |

(Continued)

FOREIGN PATENT DOCUMENTS

WO WO 9811501 A2 * 3/1998

OTHER PUBLICATIONS

Jain, Anil K. et al. "An identity-authentication system using fingerprints", Proceedings of the IEEE vol. 85, Issue 9, Sep. 1997, pp. 1365-1388.*

(Continued)

*Primary Examiner* — Michael Simitoski
(74) *Attorney, Agent, or Firm* — Lerner, David, Littenberg, Krumholz & Mentlik, LLP (57) ABSTRACT

A system and method for authenticating users based on personal information. The personal information may include age-related data where the users are interested in receiving age-restricted content. The personal information may include an address and a permission request is sent to the address. Biometric information may also be associated with the personal information.

7 Claims, 6 Drawing Sheets

U.S. PATENT DOCUMENTS

| | | | |
|---|---|---|---|
| 6,311,211 B1 | 10/2001 | Shaw et al. | |
| 6,330,610 B1 | 12/2001 | Docter et al. | |
| 6,341,169 B1 * | 1/2002 | Cadorette et al. | 382/115 |
| 6,383,078 B1 | 5/2002 | Yacenda | |
| 6,480,850 B1 | 11/2002 | Veldhuisen | |
| 6,484,263 B1 * | 11/2002 | Liu | 726/8 |
| 6,522,772 B1 * | 2/2003 | Morrison et al. | 382/124 |
| 6,523,741 B1 * | 2/2003 | DiMaria et al. | 235/375 |
| 6,525,747 B1 | 2/2003 | Bezos | |
| 6,580,356 B1 * | 6/2003 | Alt et al. | 340/5.8 |
| 6,581,059 B1 | 6/2003 | Barrett et al. | |
| 6,589,290 B1 * | 7/2003 | Maxwell et al. | 715/224 |
| 6,597,770 B2 | 7/2003 | Walker et al. | |
| 6,651,090 B1 * | 11/2003 | Itabashi et al. | 709/217 |
| 6,658,415 B1 | 12/2003 | Brown et al. | |
| 6,688,891 B1 | 2/2004 | Sanford | |
| 6,704,787 B1 * | 3/2004 | Umbreit | 709/229 |
| 6,718,328 B1 | 4/2004 | Norris | |
| 6,725,381 B1 | 4/2004 | Smith et al. | |
| 6,775,775 B1 * | 8/2004 | Yoshiura et al. | 713/186 |
| 6,829,711 B1 * | 12/2004 | Kwok et al. | 713/183 |
| 6,845,448 B1 * | 1/2005 | Chaganti et al. | 713/166 |
| 6,944,776 B1 | 9/2005 | Lockhart et al. | |
| 6,959,861 B1 * | 11/2005 | Walters | 235/380 |
| 7,254,548 B1 | 8/2007 | Tannenbaum | |
| 7,257,714 B1 * | 8/2007 | Shen | 713/186 |
| 2001/0033297 A1 | 10/2001 | Shastri et al. | |
| 2002/0019828 A1 * | 2/2002 | Mortl | 707/200 |
| 2002/0026457 A1 | 2/2002 | Jensen | |
| 2002/0032708 A1 | 3/2002 | Gupta et al. | |
| 2002/0049907 A1 | 4/2002 | Woods et al. | |
| 2002/0138326 A1 | 9/2002 | Parker et al. | |
| 2002/0194130 A1 | 12/2002 | Maegawa et al. | |
| 2003/0001016 A1 | 1/2003 | Fraier et al. | |
| 2003/0028427 A1 | 2/2003 | Dutta et al. | |
| 2003/0061111 A1 | 3/2003 | Dutta et al. | |
| 2004/0024655 A1 | 2/2004 | Estes | |
| 2005/0274797 A1 * | 12/2005 | Mollett et al. | 235/382 |

OTHER PUBLICATIONS

America Online, Inc. "Parental Controls", Mar. 2000, <http://web.archive.org/web/20000304054916/http:I/www.aol.com/info/parentcontrol.html>.

Australian Broadcasting Authority. "Online services content regulation", Nov. 1999, <http://web.archive.org/web/19991129054008/http://www.aba.gov.au/whattonline/restricted.htm>.

COPA Commission (COPA). "ID. Age Verification System", <http://www.copacommisSion.org/report/ageVedflCabOn.Shtml>, (2000).

IBM. "Rent-An-Identity", IBM technical disclosure bulletin NNRD440195, Dec. 2000.

Life Saver, http://www.best-advice.co.uk/privacy.html, Privacy Policy (Copyright dated 1999-2000) (2 pages).

Making Cookies, http://rick.dgbt.ca/wet/js/cookie.html (dated May 27, 1997) (3 pages).

Net Nanny Ltd. "Net Nanny 4 User Guide", 2000.

Net Nanny, Inc. "Net Nanny Frequently Asked Questions", 1999, <http://www.avsweb.com/nn/faq.htm>.

Netscape, Firefly and VeriSign Proposed Open Profiling Standard (OPS) to Enable Broad Personalization of Internet Servies, http://home.netscape.com/flash4/newsref/pr/newsrlease411.html (Copyright dated 1999) (4 pages).

Q*Wallet Home, www.qwallet.com (Copyright dated 1998-99) (2 pages).

Q*Wallet Screenshots, ww.qwallet.com/screens.shtml (Copyright dated 1998) (2 pages).

Q*Wallet Support, www.qwallet.com/support.shtml (Copyright dated 1998) (1 page).

Resnick, Paul et al. "PICS: Internet Access Controls Without Censorship", 1996 ACM, <http://www.w3.org/PICS/iacwcv2.htm>.

Sandiego.Com, Inc. "Parent Check", Jun. 2000, <http://web.archive.org/web/20000619014520/http://www.parentcheck.com/>.

Soular, Ray et al. "SafeSurf Internet Rating System Recieves Vroad Support From Online Community", Feb. 1996, <http://www.w3.org/PICS/960228/SafeSurf.html>.

Verifone. "Age Verification Systems", May 1998, <http://www.kelley.iu.edu/retail/resoruces/age_verification.htm>.

Yahoo, "Yahoo Permission Slips", <http://help.yahoo.com/help/us/plus/tutoreials/ypc/pc_permission1.html>, (2006).

Disney.com. "Disneycom Registration", chttp:/Neeb.archive.Org1web119990218061000/http://www.disney.com/Sign-in/index.html>, (1999).

Go Network. "Go Network Privacy Policy and Internet Safety Information", <http:/tweb.arcliive.orglweb/2000051 01411 34/http:/Tinfo.go.com/dOC/pOliCY/prIvacY.htrfll>, (2000).

LinuxGuruz. Definitions of Java and HTTP Server (1995, 1997, resp), <http://linuxguruz.com/foldoc/>.

Niccolai, James. Online child privacy act proves problematic for sites, <http://archives.cnn.com/2000/TECH/computirtg/04/25/Coppa.Snags.idg/index.html>, (2000).

Tanenbaum, Andrew S. Modern Operating Systems, 1992 Prentice Hall, Inc., pp. 1-3.

Voedisch, Lynn. You must be 18 to enter, <http://archives.cnn.com/2000/TECH/computing/O1/17/are.yOu.16.idg/indeX.html>, (2000).

* cited by examiner

METHOD AND SYSTEM FOR USER INFORMATION VERIFICATION

CROSS-REFERENCE TO RELATED APPLICATIONS

The present application is a divisional of U.S. patent application Ser. No. 09/805,555 filed on Mar. 13, 2001, now U.S. Pat. No. 7,140,045, which claims the benefit of the U.S. Provisional Application No. 60/220,869 filed on Jul. 26, 2000, the disclosures of which are hereby incorporated herein by reference.

BACKGROUND OF INVENTION

Many people are concerned about a child's ability to receive inappropriate content over the Internet. For example, many web sites display or sell pictures and videos that may not be distributed to minors. Other web sites carry content that, although it may be legally displayed to minors, would still be considered objectionable to many parents.

To prevent unauthorized access, many web site providers have instituted individual mechanisms to ensure that web site visitors are of proper age. For example, many web sites request credit card and birth date information to verify the age of the end user. However, the lack of consistency among such web sites has disadvantaged both content providers and consumers alike. To the extent the web sites request the same information, users find themselves keying in the same information over and over again. To the extent the web sites request different information, the user is plagued with remembering which site requires a particular item of information or deciding whether to disclose such information.

Moreover, most of these sites are only interested in the visitor's age and are not concerned with whether a parent would or would not give their children permission to visit the site.

Accordingly, there is a need for a method and system which controls access to web sites by minors, promotes consistency without requiring entry of repetitive information, and which allows parents to participate in the process.

SUMMARY OF THE INVENTION

The present invention provides a system and method of authenticating a user. It includes receiving a request for information from a user and receiving personal information associated with the user which includes an address. A permission request is sent to the address, and the permission request includes a request for permission to provide information to the user. Permission is received, and information is sent to the user in response to the request for information.

Another aspect of the invention involves a system and method of authenticating the age of a user over a client/server network, wherein the server has content restricted to users older than a particular age. The method includes: storing age data representative of the user's age on a client of the network; after the step of the storing, sending a request to the server for access to the content; receiving a request for the age data in response to the request for access to the content; providing the age data in response to the request for the age data; and gaining access or being denied access to the content dependant upon whether the age data indicates that the user is older than the particular age.

Yet another aspect of the invention is a system and method involving: receiving a request from the user for access to the content; receiving personal information regarding the user, the personal information including age data representative of the user's age and an e-mail address on the network; if the age data indicates that the user is older than the particular age, then sending an e-mail to the address indicating the request was received; and sending the content to the user if permission is received in response to the e-mail.

A further aspect of the invention associates and uses biometric information associated with the personal information.

DETAILED DESCRIPTION OF THE PREFERRED EMBODIMENTS

Figure 1:
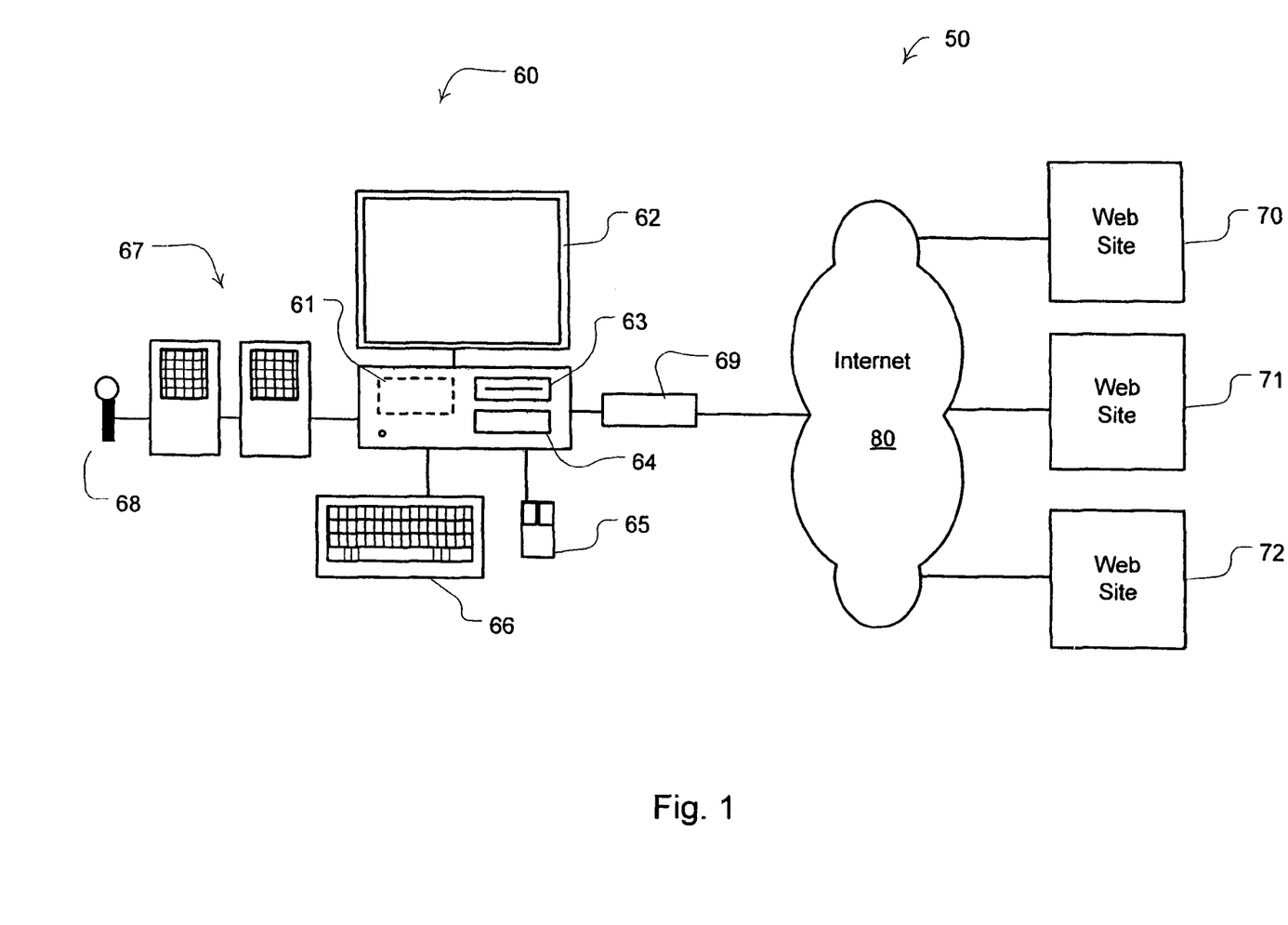
FIG. 1 is a functional diagram of a system of an embodiment of the invention.

As shown in FIG. 1, a system 50 in accordance with one embodiment of the invention comprises a network of computers such as end user personal computer 60 which communicates with web sites 70-72 via Internet 80. Although only a few computers are depicted in FIG. 1, it should be appreciated that a typical system can include a large number of connected computers. Preferably, end user computer 60 is a general purpose computer having all the internal components normally found in a personal computer such as, for example, central processing unit 61, display 62, CD-ROM 63, hard-drive 64, mouse 65, keyboard 66, speakers 67, microphone 68, modem 69 and all of the components used for connecting these elements to one another. End user computer 60 communicates with the Internet 60 via modem 69. End user computer 60 may comprise any device capable of processing instructions and transmitting data to and from humans and other computers, including but not limited to PDA's with wireless connectivity and Internet user terminals. Although CPU 61 is shown as a single processor, the instructions may actually be distributed to a number of different components or processors for execution.

Web site 70 may reside on any server or other computer capable of connecting with other computers over a network, such as a web server connected to the Internet.

A program containing data and functions in accordance with the present invention is stored in end user computer 60. Specifically, verification program 100 is stored on hard-drive 64 and executed by processor 61.

Figure 2:
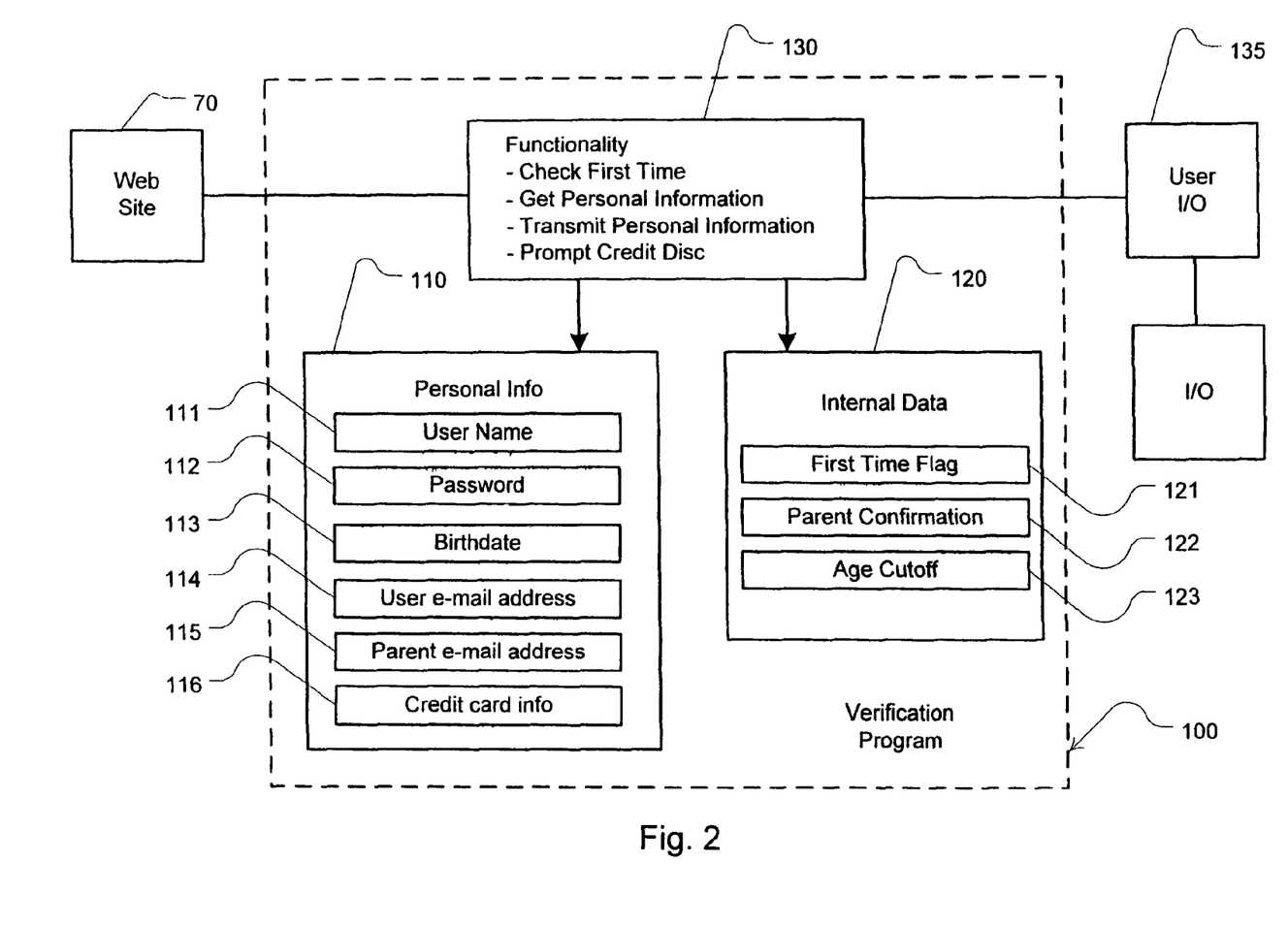
FIG. 2 is a functional diagram of a verification program, and its relationship to other components of the system, in accordance with an embodiment of the invention.

As shown in FIG. 2, some of the data maintained and manipulated by verification program 100 includes personal information 110. Personal information 110 includes user name 111, password 112, birth date 113, user e-mail address 114, parent e-mail address 115 and credit card information 116. As explained in more detail below, all of this information is provided by the end user of computer 60.

Verification program 100 also maintains and manipulates data which is not directly provided by the end user even though the values may depend upon events initiated by the user. Specifically, internal data 120 includes first time flag 121, parent confirmation 122 and age cutoff 123. Preferably, personal information 110 and internal data 120 are stored in encrypted form.

Functionality block 130 contains the routines and procedures which manipulate personal information 110 and internal data 120. These procedures are discussed in more detail below in connection with the operation of the embodiment.

The verification program 100 preferably takes the form of an executable entity such as a JAVA (JAVA is a trademark registered trademark of Sun Microsystems, Inc. applet. A JAVA applet has the advantage of being executable by various processors on different computer platforms. An applet is conducive to internet-related applications because, among other things, it can be conveniently distributed over the Internet to multiple classes of users. The applet may also be preloaded on a computer before sale to the end user. JAVA applets are also good vehicles for hiding or exposing data, functions and methods. When an executable JAVA applet is transmitted in object code form, it can encapsulate its data, i.e., the data contained in the verification program 100 cannot be accessed by external programs unless the program itself grants access to the data. Thus, encapsulation also provides the advantage of maintaining the integrity of the data because the data contained in the verification program may only be modified by calling the functions and procedures of such program. This prevents outside programs or entities from making unauthorized or inadvertent changes to the data. Moreover, the verification program 100 and its data structures are opaque, meaning that external entities do not have knowledge of how data is stored within the verification program. This enables the verification program 100 to protect the sensitive data it contains, such as credit card information 116.

Verification program 100 is also, preferably, a plug-in to internet browsers such as Microsoft Internet Explorer or Netscape Navigator. Accordingly, the verification program 100, as is typical with plug-ins, begins execution upon receipt of information from the Internet which is identified (such as by file name extension) as being intended for the verification program.

Figure 3A:
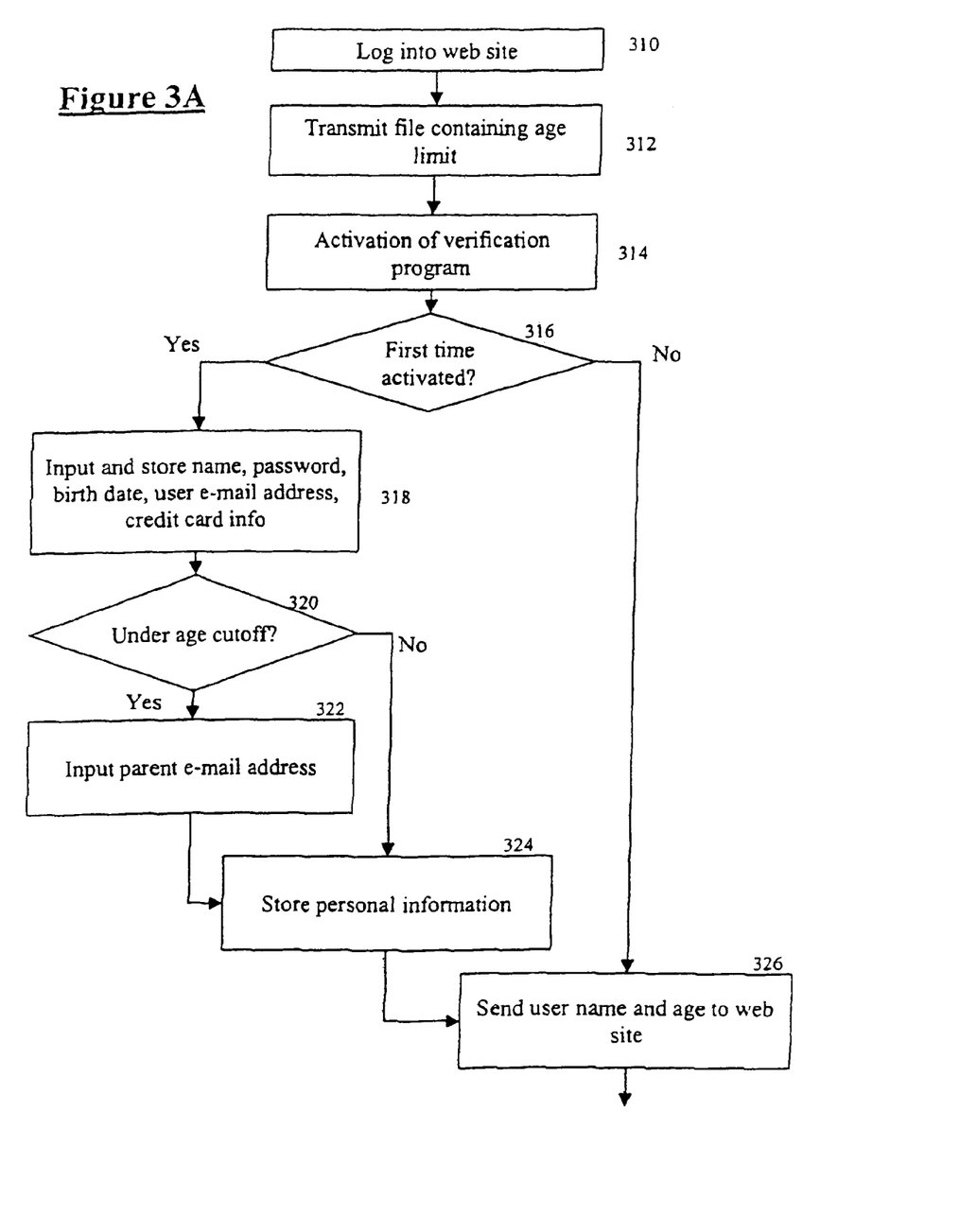
FIGS. 3A-3C are flowcharts of an embodiment of the invention.
Figure 3B:
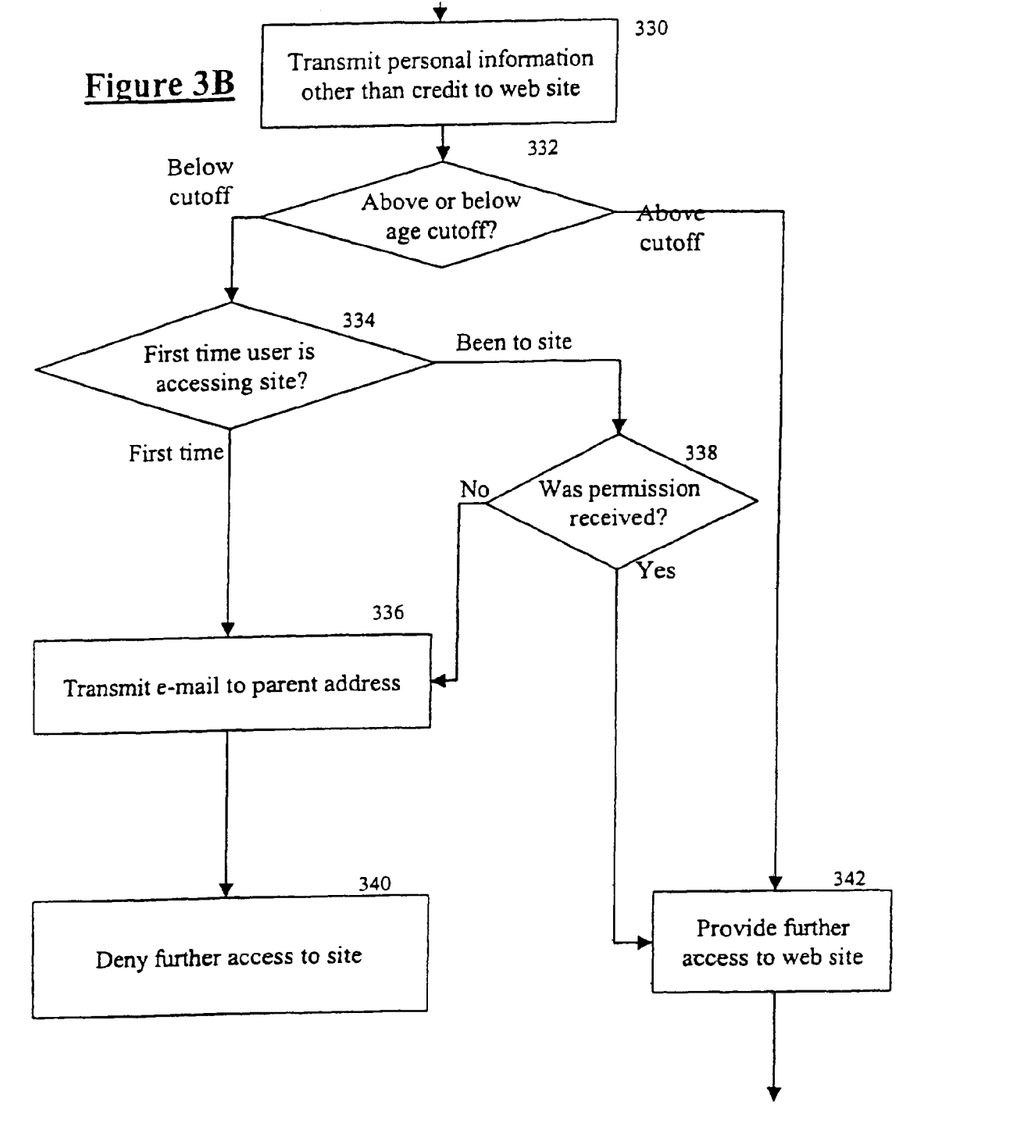
Figure 3C:
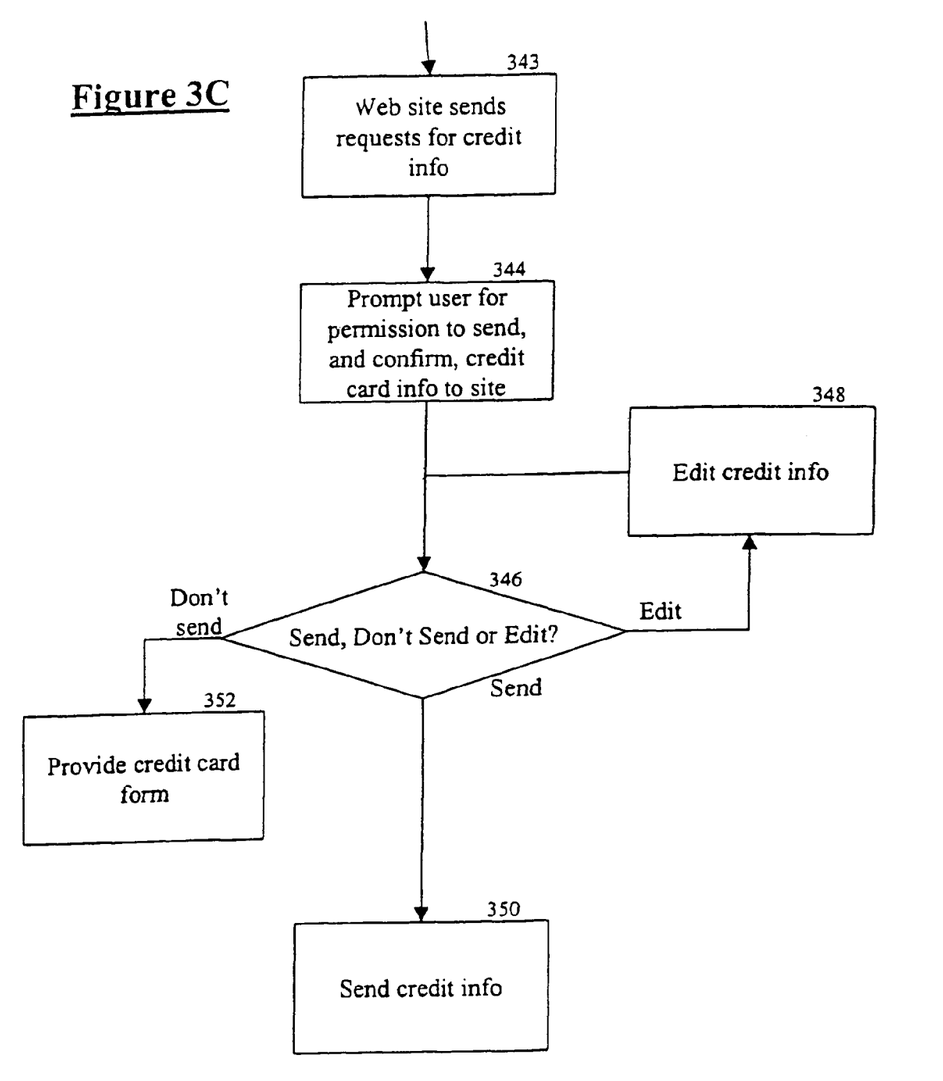

One possible operation of the foregoing embodiment is shown in the flow charts illustrated in FIGS. 3A-C. Initially, end user computer 60 logs onto a web site 70 selling age-restricted content (action 310). For example, the web site may be a video retailer selling R-rated movies. In response to receiving a new visitor, web site 70 transmits a file to end user computer 60 via internet 80 (action 312). The file may have the extension ". VER" or the like to indicate that it is a file intended for use by a verification program in accordance with the present invention. The file may contain only a single field, namely how old a person must be in order to view additional pages at web site 70 or to transact business with the web site.

Because verification program 100 is a JAVA applet functioning as a plug-in to the user's web browser, the verification program 100 will automatically launch in response to the arrival of the file (action 314). Upon activation of the verification program, functionality block 130 checks to see whether this is the first time the verification program has been executed since its installation (action 316). The program performs this check by calling the CheckFirstTime procedure upon launch of the program. The CheckFirstTime procedure checks the boolean value stored in first time flag 121 of Internal Data 120. If first time flag 121 is set to false, the program proceeds to action 326. If first time flag 121 is set to its default value of true (the value assigned upon installation), the CheckFirstTime procedure calls the GetPersonalInfo procedure.

If the verification program 100 is being executed for the first time, then verification program 100 asks the end user to input some personal information. Specifically, the GetPersonalInfo procedure displays a form on monitor 62 which requests the end user's name, password, birth date, e-mail address, and, if any, credit card information (action 318). This information is stored in personal information data 110, namely user name 111, password 112, birth date 113, user e-mail address 114, and credit card info 116 respectively. Once stored, the information cannot be changed without the password.

Once this information is entered, the GetPersonaInfo procedure computes the user's age based upon their birth date and the current date (which is typically available on common operating systems) and compares that age against the age cutoff data 123 contained in internal data 120 of verification program 100 (action 320). If the end user is under the age cutoff, then the GetPersonalInfo procedure requests that the user input the e-mail address of the user's parent. Alternatively, if the e-mail address of the parent is preloaded on the computer, then this information may be automatically filled in. This information is stored in parent e-mail address 115. The GetPersonalInfo procedure then sets first time flag 121 to false.

As shown in FIG. 3B, verification program 100 next transmits a file to web site 70 containing all of the data in personal information data 110 except credit card info 116 (action 330).

Based on the birth date transmitted by verification program 100, web site 70 determines whether the user is above or below the web site's age cutoff (action 332). If the user is above the site's age cutoff, i.e., the user is old enough, then the user is provided further access to the web site (action 332).

On the other hand, if the user's age is below the age cutoff, then web site 70 will check its records based on the user name and determine whether this particular user has been to the site before (action 334). If it is the user's first visit to the site, then web site 70 will send an e-mail to the parent e-mail address 115 provided by verification program 100 (action 336). The e-mail will explain that the person having user name 111 has attempted to access content on web site 70, that that content is restricted to users of a particular age, and will ask the parent to permit or deny further access to the web site. Confirmation or denial of permission may be provided in any number of ways. By way of example only, permission may be granted by simply replying to the e-mail, and upon receipt of the e-mail the user name will be extracted from the e-mail so the web site's records can be updated. Alternatively, the e-mail could contain a URL and a special code associated with the child's user name, and the parent must log onto the web site and provide the code in order to grant permission. Regardless of the method of permission confirmation, after the e-mail is sent to the parent's e-mail address, the user will be notified that: parental permission has been requested; further access to the web site 70 is temporarily denied; and the user should try again later after parental permission has been sent (action 340).

The next time the user accesses the site, the site will know that the user has been to the site before (action 334) and will check if permission was received (action 338). If permission was not received, then web site 70 will repeat the action of transmitting an e-mail to the parent's address requesting permission for the child to access the web site (action 336). In addition, the user will again be directed to a web page stating that further access is denied until permission has been received (action 340).

If permission was received, then further access will be provided to the web site (action 342).

The present invention has the further benefit of facilitating electronic commerce. If web site 70 is configured for electronic transactions, there will be no need for the user to key in his or her credit card information in order to complete a transaction. Rather, because web site 70 knows that the user has installed the verification program 100, it will not provide the user with a form for filling in credit card information. Instead, as shown by action 343 of FIG. 3C, web site 70 will send a request to verification program 100 (located on end user computer 60) for credit card information 116. In response to this request, functionality block 130 will call the PromptCreditDisc procedure. This procedure prompts the user for permission to disclose the credit card information stored in personal information data 110. One manner in which PromptCrediDisc may request such permission is to display a dialog box on monitor 62 which lists the credit card info (such as the type of credit card, credit card number and expiration date) and provide the user with three choices: "Send", "Don't Send", and "Edit" (action 346). If the user clicks "Edit", then the program will call the GetPersonalInfo procedure again and provide the user with an opportunity to change the credit information (action 348). After the information is edited, the user will be prompted with the same dialog box as before (action 346).

If the user clicks "Send", then functionality block 130 will call the TransmitPersonalInfo procedure again, but this time credit card info 116 will be included with the information sent to web site 70.

If the user clicks "Don't Send," then functionality block 130 will call the TransmitPersonalInfo procedure again, but this time it will send a code indicating that the user has refused to provide his or her credit information. Upon receipt of that notification, web site 70 will send the user to the site's standard web page containing a credit card entry form (action 352).

The present invention provides numerous advantages. It allows parents to restrict in the browsing habits of children without knowing in advance which sites the child is logging on to. Moreover, it allows parents to see what sort of web sites their children are visiting and permit (or deny) access to web sites before the child can proceed further. Indeed, the verification program may prevent the browser from browsing sites which do not support the aforementioned process. In addition, the invention alleviates the need for a user to constantly put in the same information over and over again. To the contrary, personal information is conveyed automatically and credit information is conveyed with a click of a single button.

The present invention has the further advantage of permitting any number of variations in its implementation. For example, because the program is likely to be installed by a parent on a family computer, verification program 100 may request personal information 110 as soon as the installation is complete (action 318) rather than waiting for the first time the program is executed (action 316). That way, the parent is ensured that the correct information (especially the user's birth date and parent's e-mail address) is being provided. The verification program may also store a list of all web sites which asked the program for the user's personal information. Thus, even if the child terminated the process before an email was sent to the parent, the parent would be able to see a list of the age-restricted sites the child tried to access.

In addition, Age Cutoff Data 123 could be set by the parent rather than simply relying on a default value. Thus, a parent could adjust the cutoff age upward or downward to reflect the child's maturity.

The Age Cutoff Data 123 may also include more than a single numeric value. The Age Cutoff Data may have different ages for different classes of information. For example, with respect to web sites that sell movies, the Age Cutoff Data is usually 13 years old for PG-13 rated movies and 17 years old for R-rated movies. However, some children may be ready to watch PG-13 rated movies at 11 years of age and R-rated movies at 15 years of age. One manner of storing such information in Age Cutoff Data 123 would be to use an XML (Extended Markup Language) document that provides different ages for different classes. As long as both the verification program 100 and the web site 70 are using the same syntax for how the XML document is formatted, they can pass more than one age based on more than one criteria. Using the foregoing example, the value contained in Age Cutoff Data 70 may be a string having the value "<movies> <R-rated> 15 </R-rated > <PG-13>11 </PG-13> </movies>." This information would be sent to the web site in action 330 of FIG. 3B, so that the web site can compare the contents of the web page to be accessed (such as a web page allowing the purchase of R-rated movies) with the appropriate value of the XML document in the Age Cutoff Data (in this case, the age at which the user is permitted to buy R-Rated movies, i.e., 15 years old). Based on whether or not the age of the child exceeds that value, the child will either be allowed or prevented from purchasing the movie.

In yet another aspect of the invention, access is not based on age but, rather, some other personal characteristic which can be represented by a value. For example, the verification program may store XML information indicating that the user is not entitled to receive certain categories of content, such as violent movies regardless of the child's age, without parental permission. If so, step 312 would involve the web site transmitting a statement that the site contains violent content, step 330 would involve the verification program indicating that the user cannot review violent content without parental permission and the rest of the process would solicit and check for that permission. The value of personal characteristic can accordingly be any type of value, be it numeric as in the case of age or true/false in the case of the ability to receive violent content (false could also be indicated by failing to mention the characteristic at all in the verification program).

In another embodiment of the present invention, each user of a particular end user computer 60 will have a separate set of personal information 110. In such a case, the user will have to log in with his or her name and password when the browser is launched. The advantage of such a system in that each person will have their own personal information, including birth date 113. Thus, an adult will be able to access age-restricted web sites without encountering the permission-gathering mechanisms confronted by a child. Moreover, because different children typically have different ages, each child will obtain access based on their own age.

Instead of each web site maintaining its own log of parental permissions, the name of the web site and whether permission is granted may also be stored in parent confirmation data 122. In this embodiment, the parent enters his or her confirmation directly into the verification program, which is stored in internal data 120. This information is sent to web site 170 during action 334. If the site determines (based on parent confirmation data 122) that permission has been granted, then the user will be permitted further access (action 342).

Figure 4:
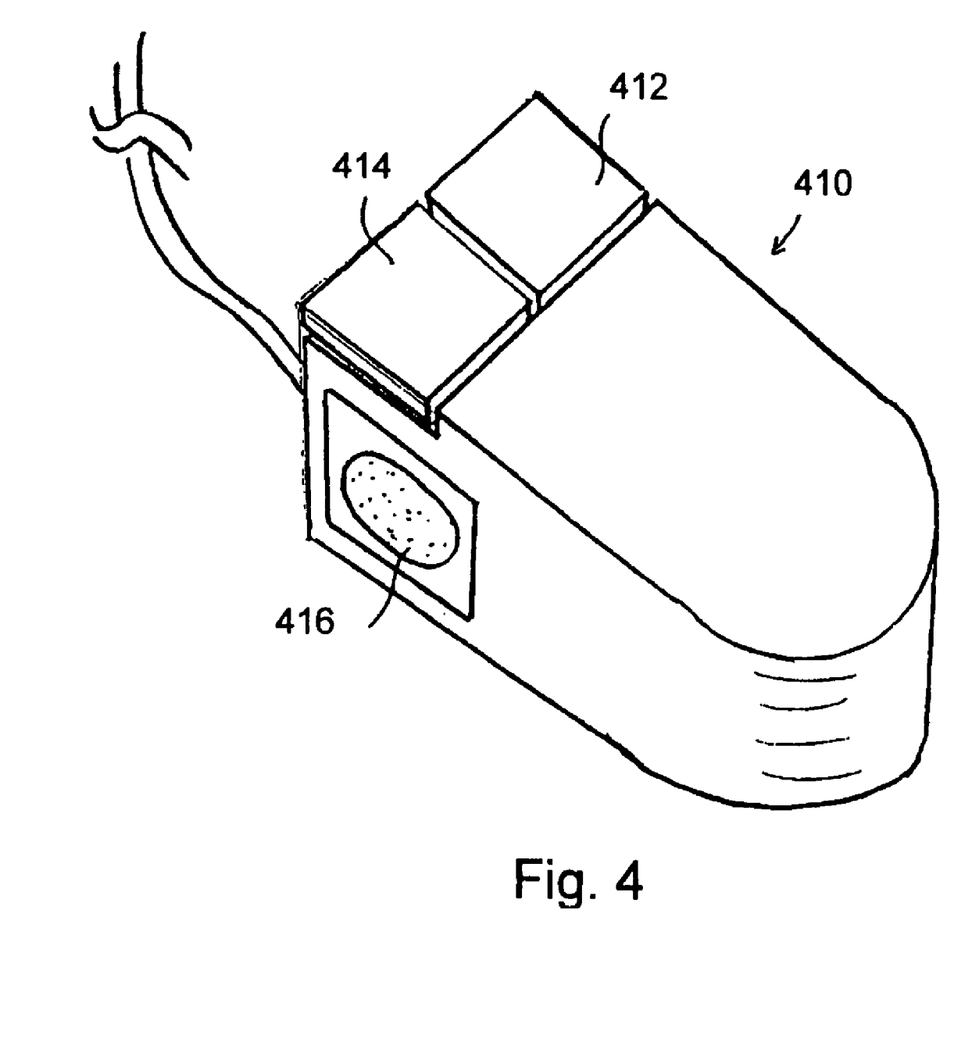
FIG. 4 is biometric-enabled peripheral which may be used in accordance with an embodiment of the invention.

Preferably, rather than having each user input a user name and password, the end user computer 60 identifies the user and their associated personal information 110 based on their fingerprint or other biometric information. As shown in FIG. 4, mouse 410 contains an area 416 for reading the fingerprint of the person using the mouse. The fingerprint information is used by functionality block 130 to match the personal information 110 with the person operating the mouse. Thus, functionality block 130 will only send information about that person, and no one else, to the web sites 70. The advantage of using such a device is both security, i.e. preventing a child from pretending to be an adult, and ease of use, i.e. the user does not have to input their name and password. Fingerprint reader 416 may also be placed on other parts of the mouse such as buttons 412 or 414.

Unless stated to the contrary, use of the word "included" herein or any variation thereof, means "including without limitation" and shall not be construed to limit any general statement that it follows to the specific or similar items or matters immediately following it.

Most of the foregoing alternative embodiments are not mutually exclusive, but may be implemented in various combinations to achieve unique advantages. As these and other variations and combinations of the features discussed above can be utilized without departing from the invention as defined by the claims, the foregoing description of the embodiments should be taken by way of illustration rather than by way of limitation of the invention as defined by the claims.

The invention claimed is:

1. A method of authenticating the age of a user comprising:
   storing, at a client device, personal information regarding said user, said personal information including a value that is indicative of said user's age and biometric information of said user, wherein the stored biometric information is associated with the value,
   inputting biometric information using a mouse,
   identifying the value associated with the biometric information stored at the client device if the inputted biometric information matches the biometric information stored at the client device;
   determining, by the client device, whether to request additional information based on the result of a comparison of the value that is indicative of said user's age with a threshold;
   sending, by the client device, to a remotely located content provider a request for access to content restricted to users based on a cut-off associated with said value,
   sending, by the client device, said value to the remotely located provider of said content, and
   receiving said content electronically at the client device.

2. The method of claim 1 wherein said inputted biometric information comprises a fingerprint.

3. The method of claim 1 wherein said personal information includes an email address associated with the user for receiving confirmation from said email address that said user is authorized to access the restricted content.

4. The method of claim 1 further comprising receiving an electronic request for confirmation that said user is authorized to access the restricted content.

5. The method of claim 1 wherein said personal information includes a username, wherein said username is associated with a pass code for confirming that said user is authorized to access the restricted content.

6. A system of authenticating a user comprising:
   a client device including a processor for executing instructions,
   a mouse having an area for obtaining biometric information about a user,
   instructions stored at the client device and operable by the processor of the client device, said instructions including: storing personal information regarding said user, said personal information including a value that is indicative of said user's age, and biometric information of said user, wherein the stored biometric information is associated with the value; receiving biometric information; identifying the value associated with the biometric information stored at the client device if the received biometric information matches the biometric information stored at the client device; sending to a remotely located content provider a request for access to content restricted to users based on a cut-off associated with said value; determining whether to request additional information based on the result of a comparison of the value that is indicative of said user's age with a threshold; sending said value to the provider of said content; and receiving an e-mail containing said content.

7. A non-transitory computer readable storage medium including instructions executable by a processor, the instructions comprising:
   storing personal information associated with a plurality of users, the personal information associated each user including (1) a value that is indicative of the particular user's age and (2) biometric information;
   receiving biometric information;
   identifying a value associated with a particular user by comparing the received biometric information to the biometric information of the personal information associated with the plurality of users;
   determining whether to request additional information based on the result of a comparison of the value that is indicative of said user's age with a threshold;
   sending the identified value of the particular user to a web site for access to age-restricted content and; and
   receiving access to the age-restricted content.

* * * * *

UNITED STATES PATENT AND TRADEMARK OFFICE
CERTIFICATE OF CORRECTION

PATENT NO. : 8,037,316 B2  
APPLICATION NO. : 11/540231  
DATED : October 11, 2011  
INVENTOR(S) : Gregory D. Gudorf et al.

Page 1 of 1

It is certified that error appears in the above-identified patent and that said Letters Patent is hereby corrected as shown below:

In the Specification  
Column 1, line 36, "their" should read --his or her--  
Column 1, line 39, "controls" should read --control--  
Column 1, line 39, "promotes" should read --promote--  
Column 1, line 41, "allows" should read --allow--  
Column 2, line 42, "PDA's" should read --PDAs--  
Column 3, line 7, "applet." should read --applet.)--  
Column 3, line 10, "internet-related" should read --Internet-related--  
Column 3, line 31, "internet browsers" should read --Internet browsers--  
Column 3, line 43, "internet 80" should read --Internet 80--  
Column 4, line 9, "their birth" should read --his or her birth--  
Column 6, line 31, "characteristic" should read --characteristics--  
Column 6, line 40, "system in" should read --system is--  
Column 6, line 41, "their own" should read --his or her own--  
Column 6, line 46, "their own" should read --his or her own--  
Column 6, line 58, "their associated" should read --his or her associated--  
Column 6, line 58, "on their" should read --on his or her--  
Column 7, line 1, "their name" should read --his or her name--

In the Claims  
Column 8, line 33, "associated each" should read --associated with each--

Signed and Sealed this  
Twenty-sixth Day of November, 2013

Margaret A. Focarino  
*Commissioner for Patents of the United States Patent and Trademark Office*